D. R. SMITH.
SAW HANDLE.
APPLICATION FILED AUG. 8, 1921.

1,405,344.

Patented Jan. 31, 1922.

Dell R. Smith, INVENTOR.

BY David E. Lain,
ATTORNEY.

UNITED STATES PATENT OFFICE.

DELL R. SMITH, OF BLANCHARD, WASHINGTON.

SAW HANDLE.

1,405,344.  Specification of Letters Patent.  Patented Jan. 31, 1922.

Application filed August 8, 1921. Serial No. 490,472.

*To all whom it may concern:*

Be it known that I, DELL R. SMITH, a citizen of the United States, and a resident of Blanchard, in the county of Skagit and State of Washington, have invented a new and useful Saw Handle, of which the following is a specification.

My invention relates to improvements in saw handles, the kind used on cross-cut saws used for hand sawing timber, and the objects of my improvement are to provide a handle that will firmly hold the saw, will be reversible and have a holding pin which may be retained in the handle while the saw is being removed therefrom.

Figure 1:
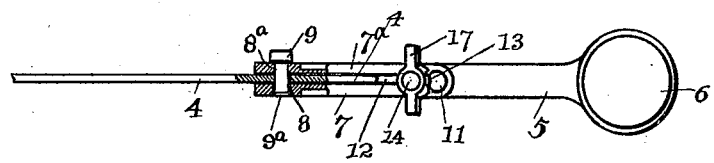
Figure 2:
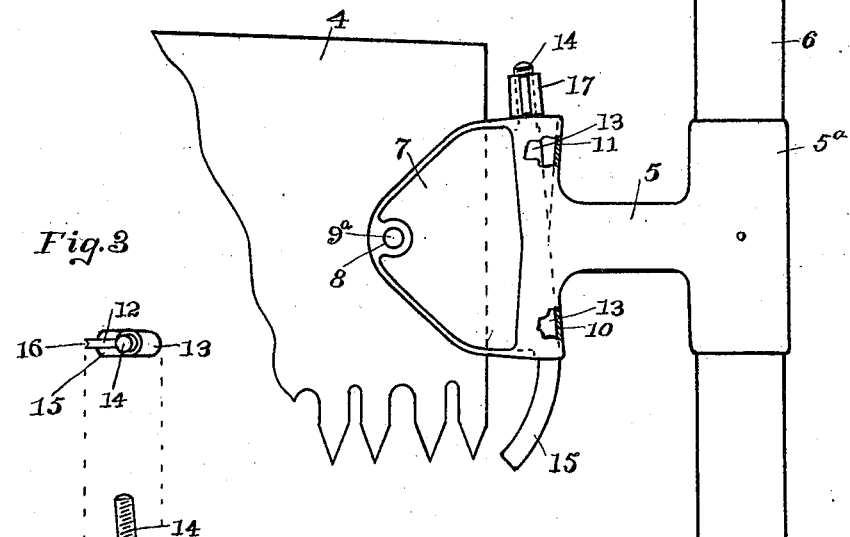
Figure 3:
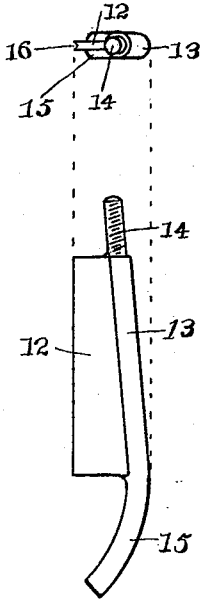

I attain these objects with the mechanism illustrated in the accompanying sheet of drawings in which Figure 1 is a plan view of a saw installed in my handle, Fig. 2 is a side elevation of Fig. 1 and Fig. 3 shows plan and side elevation views of my key wedge.

Similar characters refer to similar parts throughout. Certain parts are broken away to disclose other parts hidden thereby.

More particularly: 4 is the saw, the major portion of which is broken away for lack of space.

5 is the shank of the saw handle.

$5^a$ is the socket in which is mounted fixed handle bars 6, preferably protruding from the socket more at one end than at the other.

7, $7^a$ are spaced cheeks with a channel between them, forming a channeled plate.

8 is a pin hole in cheek 7, and $8^a$ is a smaller hole in cheek $7^a$ registering therewith. The inner end of hole $8^a$ is countersunk to the size of hole 8.

9 is a headed pin inserted in holes 8 and $8^a$ with its end upset to fill hole 8, and when it is withdrawn across the channel the upset end occupies the countersunk part of hole $8^a$ leaving the channel free of said pin.

The closing wall of the channel is formed by two intersecting, inclined, hollow cylinders 10 and 11.

12 is a wedged shaped plate having a grooved front edge 16 and an inclined cylindrical, back rib 13.

14 is an extension of one end of rib 13 threaded to receive wing nut 17.

15 is an extension of the other end of rib 13 to form a guard.

To install a saw in my handle, one end of the saw is placed in the channel and pin 9 inserted through the hole in the saw and also into hole 8. Wedge 12 is introduced into the channel behind the saw with rib 13 in groove 10 and groove 16 engaging the end of the saw, and forced home by screwing nut 17 on screw 14 till it bears on the cheeks when the saw will be firmly held in the handle.

To remove, nut 17 is loosened, wedge 12 forced back, when pin 9 can be easily withdrawn and the saw taken out.

If the longer end of bar 6 is preferred down, rather than up as shown, the handle is reversed and rib 13 placed in groove 11. Operatives frequently find it convenient to change the longer end of the bar to better suit the character of the work.

Since rib 13 is thicker than wedge plate 12, grooves 10 and 11 in the handle channel retain the wedge both in its illustrated and in its reversed positions. This is clearly shown in Fig. 1 where the channel walls close in behind rib 13 and prevent it from moving rearward into void 11. The handle is symmetrical on both sides of a horizontal, medial line in Fig. 2, therefore, as stated, when wedge 12 is placed end-for-end in the handle channel, rib 13 could not move rearward into void 10; which is, doubtless, apparent without further illustration.

Having thus fully disclosed my invention, what I claim is new and desire to secure by Letters Patent is,—

1. In a saw handle in combination, a handle-bar socket, a handle bar fixed in said socket protruding unequally from the ends thereof, a shank fixed to said socket, a channeled plate fixed to said shank adapted to receive one end of a saw and a wedge plate and having a V form bottom inclined from its center toward said shank, a wedge plate adapted to enter said channel between said saw and said channel bottom and having a grooved edge engaged with said saw, and a pin through said channeled plate and said saw.

2. In a saw handle in combination, a handle-bar socket, a handle bar fixed in said socket protruding unequally from the ends thereof, a shank fixed to said socket, a channeled plate fixed to said shank adapted to receive one end of a saw and a wedge plate and having a channel bottom of increased width and flaring from its center toward said socket with intersecting grooves in the side walls of said channel extending in right lines from the vertex of said bottom, one end of a saw mounted in said channel, a wedge plate, having a rib on one edge with a threaded extension of one end and an extension of the other end adapted for a guard, mounted in said channel between said saw and said channel bottom with said rib in the enlargement of said channel bottom on one side of said vertex and in said groove extensions of the same, a nut on said threaded rib extension bearing on said channeled plate, and a pin through said channeled plate and said saw.

DELL R. SMITH.